(12) United States Patent
Chen et al.

(10) Patent No.: US 8,797,950 B2
(45) Date of Patent: Aug. 5, 2014

(54) DUAL-LAYER BEAM FORMING IN CELLULAR NETWORKS

(75) Inventors: Runhua Chen, Dallas, TX (US); Eko Nugroho Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 141 days.

(21) Appl. No.: 12/787,387

(22) Filed: May 25, 2010

(65) Prior Publication Data

US 2010/0303034 A1   Dec. 2, 2010

Related U.S. Application Data

(60) Provisional application No. 61/181,375, filed on May 27, 2009.

(51) Int. Cl.
*H04W 4/00* (2009.01)

(52) U.S. Cl.
USPC .......................................... 370/328; 370/329

(58) Field of Classification Search
USPC ................................. 370/328, 329
See application file for complete search history.

(56) References Cited

U.S. PATENT DOCUMENTS

2010/0002800 A1* 1/2010 Kim et al. ...................... 375/295
2012/0008577 A1* 1/2012 Han et al. ...................... 370/329

OTHER PUBLICATIONS

3GPP, "3rd Generation Partnership Project; Technical Specification Group Radio Access Network; Evolved Universal Terrestrial Radio Access (E-UTRA); Physical Channels and Modulation", 3GPP TS 36.211, Release 9, V9.1.0, Mar. 2010, Valbonne, France, pp. 1-85.
3GPP, "3rd Generation Partnership Project; Technical Specification Group Radio Access Network; Evolved Universal Terrestrial Radio Access (E-UTRA); Multiplexing and channel coding", 3GPP TS 36.212, Release 9, V9.1.0, Mar. 2010, Valbonne, France, pp. 1-61.

* cited by examiner

*Primary Examiner* — Sai-Ming Chan
(74) *Attorney, Agent, or Firm* — Ronald O. Neerings; Wade James Brady; Frederick J. Telecky, Jr.

(57) ABSTRACT

Single user and multiuser MIMO transmission in a cellular network may be performed by selecting by a base station (eNB) to transmit either one or two transmission layers. When one transmission layer is selected, a first transmission layer is precoded with a first precoder. A first demodulation reference signal (DMRS) sequence or a second DMRS sequence is selected by the eNB and precoded using the first precoder. The first transmission layer is transmitted with the selected precoded DMRS from the eNB to a user equipment (UE), and an indicator is transmitted to the UE to indicate which DMRS sequence is selected and transmitted.

8 Claims, 6 Drawing Sheets

DUAL-LAYER BEAM FORMING IN CELLULAR NETWORKS

CLAIM TO PRIORITY UNDER 35 U.S.C. 119

The present application claims priority to and incorporates by reference U.S. provisional application No. 61/181,375 filed on May 27, 2009, entitled "Dual-Layer BF for SU-MIMO and DU-MIMO in Rel-9."

FIELD OF THE INVENTION

This invention generally relates to wireless cellular communication, and in particular to multi-input multi-output transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware may be portable.

User equipment (UE), also commonly referred to as a terminal or a mobile station, may be a fixed or mobile device and may be a wireless device, a cellular phone, a personal digital assistant (PDA), a wireless modem card, and so on. Uplink communication (UL) refers to a communication from the UE to the NodeB, whereas downlink (DL) refers to communication from the NodeB to the UE. Each NodeB contains radio frequency transmitter(s) and the receiver(s) used to communicate directly with the UE, which may move freely around it. Similarly, each UE contains radio frequency transmitter(s) and the receiver(s) used to communicate directly with the NodeB. In cellular networks, the UE cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA (orthogonal frequency division multiple access) and SC-FDMA (single carrier FDMA) access schemes were chosen for the down-link (DL) and up-link (UL) of E-UTRA, respectively. User equipment are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (TS 36.211 Release 8, or later)."

Several types of physical channels are defined for the LTE downlink. One common characteristic of physical channels is that they all convey information from higher layers in the LTE stack. This is in contrast to physical signals, which convey information that is used exclusively within the physical (PHY) layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. In downlink transmission, two types of reference signals are available. The first type of reference signal is un-precoded and is transmitted over the entire system bandwidth of a cell, and is generally referred to as cell-specific reference signal (CRS). Another type of reference signal is modulated by the same precoder as applied on the data channel, and therefore enables a UE to estimate the effective precoded MIMO channel characteristics, This type of RS is sometimes referred to as De-Modulation RS or DMRS. DMRS is transmitted only when a UE is being scheduled, and is therefore only transmitted over the frequency resource assignment of data transmission. Note that DMRS can also be applied in uplink transmission (PUSCH), in case UE transmitter is equipped with multiple antennas. Note that RS can also be transmitted for other purposes, such as channel sounding (SRS), synchronization, or any other purpose. Also note that Reference Signal (RS) can be sometimes called the pilot signal, or the training signal, or any other equivalent term.

The LTE PHY can optionally exploit multiple transceivers and antenna at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following cyclic delay diversity (CDD) precoding methods: zero-delay, small-delay, or large-delay CDD. Spatial multiplexing may also be referred to as MIMO (multiple input multiple output).

With MRC, a signal is received via two (or more) separate antenna/transceiver pairs. The antennas are physically separated, and therefore have distinct channel impulse responses. Channel compensation is applied to each received signal within the baseband processor before being linearly combined to create a single composite received signal. When combined in this manner, the received signals add coherently within the baseband processor. However, the thermal noise from each transceiver is uncorrelated, resulting in improved signal to noise ratio (SNR). MRC enhances link reliability, but it does not increase the nominal system data rate since data is transmitted by a single antenna and is processed at the receiver via two or more receivers. MRC is therefore a form of receiver diversity rather than more conventional antenna diversity.

MIMO, on the other hand, does increase system data rates. This is achieved by using multiple antennas on both the transmitting and receiving ends. In order to successfully receive a MIMO transmission, the receiver must determine the channel impulse response from each transmitting antenna. In LTE, channel impulse responses are determined by sequentially transmitting known reference signals from each transmitting antenna. While one transmitter antenna is sending the reference signal, the other antenna is idle. Once the channel impulse responses are known, data can be transmitted from both antennas simultaneously. The linear combination of the two data streams at the two receiver antennas results in a set of two equations and two unknowns, which is resolvable into the two original data streams.

Physical channels are mapped to specific transport channels. Transport channels are service access points (SAPs) for higher layers. Each physical channel has defined algorithms for bit scrambling, modulation, layer mapping, precoding, and resource assignment. Layer mapping and precoding are related to MIMO applications. Basically, a layer corresponds to a spatial multiplexing channel. Channel rank can vary from one up to the minimum of number of transmit and receive antennas. For example, given a 4×2 system, i.e., a system having four transmit antennas and two receive antennas, the maximum channel rank is two. The channel rank associated with a particular connection varies in time and frequency as the fast fading alters the channel coefficients. Moreover, the channel rank determines how many layers, also referred to as the transmission rank, can be successfully transmitted simultaneously. For example, if the channel rank is one at the instant of the transmission of two layers, there is a strong likelihood that the two signals corresponding to the two layers will interfere so much that both of the layers are erroneously detected at the receiver. In conjunction with precoding, adapting the transmission to the channel rank involves striving to use as many layers as the channel rank. Layer mapping specifies exactly how the extra transmitter antennas are employed. The precoding applied for the demodulation reference signal (DMRS) is the same as the one applied for the PUSCH (for uplink) and PDSCH (for downlink). Cyclic shift separation is the primary multiplexing scheme of the demodulation reference signals.

Precoding is used in conjunction with spatial multiplexing. MIMO exploits multipath to resolve independent spatial data streams. In other words, MIMO systems require a certain degree of multipath for reliable operation. In a noise-limited environment with low multipath distortion, MIMO systems can actually become impaired. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel based on a certain selection criterion. Some examples of selection criterion include average throughput and maximum signal-to-interference-noise ratio (SINR). Sequences of symbol vectors thus form a set of parallel symbol streams and each such symbol stream is referred to as a "layer". Thus, depending on the choice of precoder in a particular implementation, a layer may directly correspond to a certain physical antenna or a layer may, via the precoder mapping, be distributed onto several physical antennas.

In LTE Rel-8, single layer beamforming on antenna port 5 is already supported. Single-layer beamforming is based on non-codebook precoding and relies on a dedicated demodulation reference symbol (DMRS) for data demodulation. DMRS symbols are precoded with the same precoding matrices as the PDSCH data symbols and therefore enable UE to estimate the "effective" channel after precoding. Rank-1 transmission is enforced. A UE is restricted to receive a single transport block (codeword) which is mapped to one layer (data stream) in DL transmission. From the UE's perspective, the effective 1-layer channel appears as if data is transmitted from a single virtual antenna. DMRS corresponding to this layer is defined as antenna port 5 in LTE Rel-8 to enable channel estimation.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Embodiments of the invention support single user (SU) dual-layer beamforming using UE specific RS for both LTE-TDD (time division duplex) and FDD (frequency division duplex) using UE specific demodulation reference signals and mapping of physical data channel to resource elements that may provide forward compatibility with LTE-A Demodulation RS (DMRS). Embodiments of the invention extend single user dual-layer beamforming to multi-user dual-layer beamforming, as will be described in more detail below.

Figure 1:
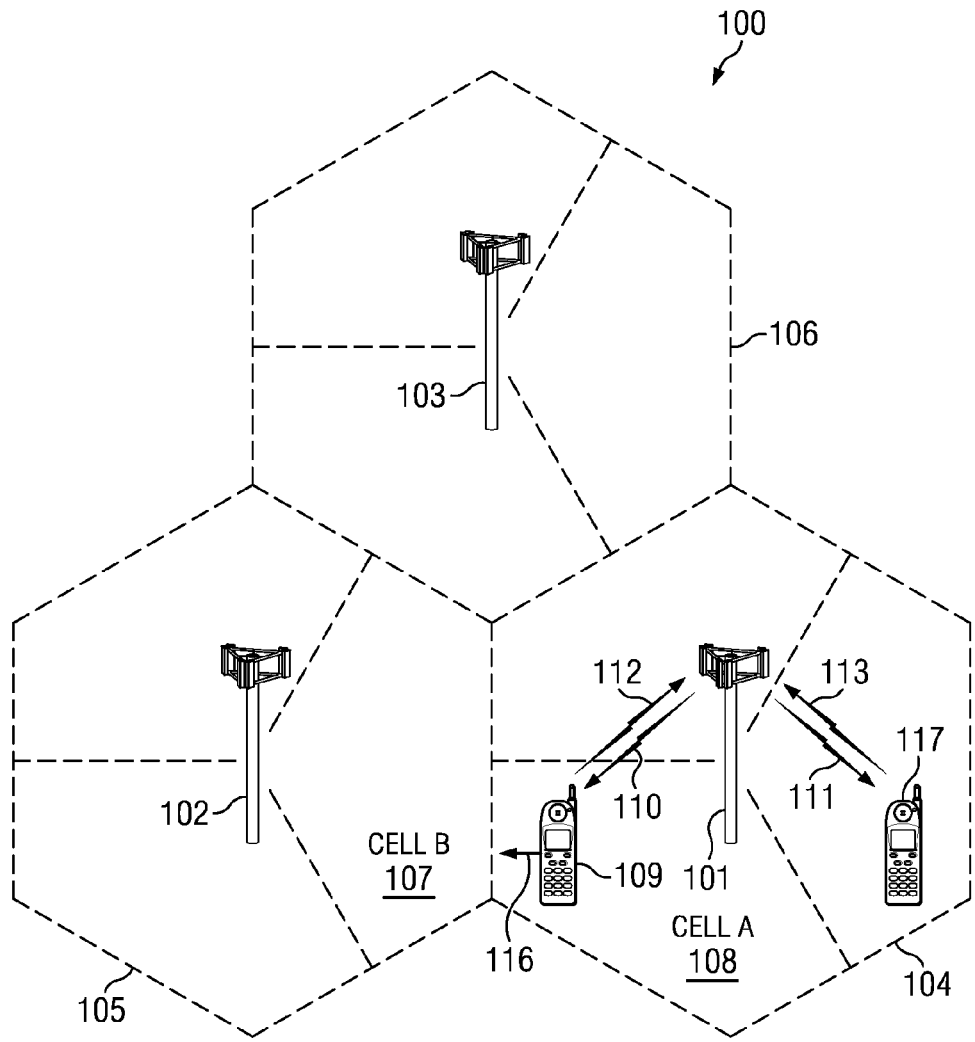
FIG. 1 is a pictorial of an illustrative telecommunications network in which an embodiment of the invention is used to support single user and multiuser MIMO transmission signals.

FIG. 1 is a pictorial of an illustrative telecommunications network 100 in which an embodiment of the invention is used to support single user and multiuser MIMO transmission signals, as described in more detail below. The illustrative telecommunications network includes eNBs 101, 102, and 103, though in operation, a telecommunications network may include many more eNBs or fewer eNBs. Each of eNB 101, 102, and 103 is operable over corresponding coverage areas 104, 105, and 106. Each eNB's coverage area is further divided into cells. In the illustrated network, each eNB's coverage area is divided into three cells. Handset or other UE 109 is shown in Cell A 108, which is within coverage area 104 of eNB 101. Transmission occurring between eNB 101 and UE 109 via downlink channel 110 and uplink channel 112. As UE 109 moves 116 out of Cell A 108, and into Cell B 107, UE 109 may be "handed over" to eNB 102.

When UE 109 is not up-link synchronized with eNB 101, non-synchronized UE 109 employs non-synchronous random access (NSRA) to request allocation of up-link 112 time or frequency or code resources. If UE 109 has data ready for transmission, for example, traffic data, measurements report, tracking area update, etc., UE 109 can transmit a random access signal on up-link 112 to eNB 101. The random access signal notifies eNB 101 that UE 109 requires up-link resources to transmit the UE's data. ENB 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by eNB 101, UE 109 may adjust its transmit timing, to bring the UE 109 into synchronization with eNB 101, and transmit the data on up-link 112 employing the allotted resources during the prescribed time interval. eNB 101 also sends a downlink grant to UE 109 when the eNB has data to transmit to UE 109. The downlink grant specifies one or more resource blocks on which the eNB will transmit to the UE on downlink 110.

Similarly, UE 117 may communicate with eNB 101 on downlink 111 and uplink 113. eNB 101 may decide send data on DL 110 in SU-MIMO mode to UE 109. Alternatively, eNB 101 may decide to send data on DL 110 to UE 109 and on DL 111 to UE 117 in MU-MIMO mode, as will be described in more detail below.

Figure 2:
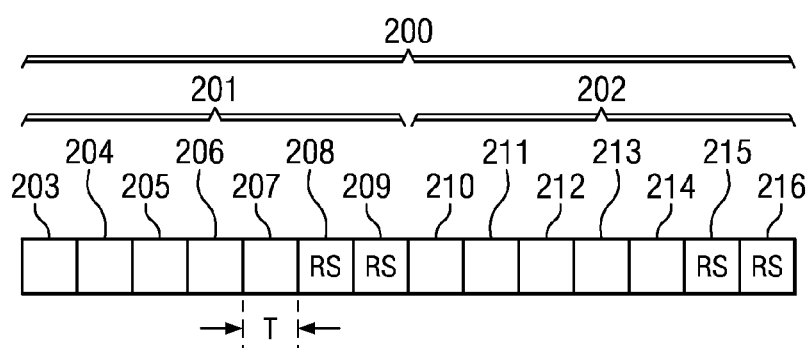
FIG. 2 is an illustrative format of one subcarrier (tone) of a DL transmission subframe for use in the network of FIG. 1.

FIG. 2 is an illustrative format of one subcarrier (tone) of a DL transmission subframe for use in the network of FIG. 1. It comprises of 14 resource elements. Elements of the present invention will be described in the context of EUTRA sub-frame, even though its applicability is broader. Orthogonal frequency division multiple access (OFDMA) based systems include classic OFDMA as well as its alternatives, like single carrier frequency division multiple access (SC-FDMA) and discrete Fourier transform (DFT)-spread OFDMA. In OFDMA based systems, frequency resources are divided into tones. Tones are further grouped into "tone blocks" or "resource blocks" for purposes of frequency-dependent scheduling of mobiles, and other possible purposes. Thus, each mobile can be allocated one or more resource blocks in an OFDMA based system. This group of resource blocks will be denoted as the frequency allocation for a given mobile.

FIG. 2 illustrates just one subcarrier of sub-frame 200 comprising two slots 201 and 202. It comprises of 14 resource elements. This resource element is configured for use on antenna port 7 or 8, as will be described in more detail below. Duration of the EUTRA sub-frame is 1 ms, which means that duration of two slots 201 and 202 is 0.5 ms each. Each slot comprises seven symbols when a normal cyclic protection field (CP) is appended to each symbol, or six symbols when an extend CP is appended to each symbol. For example, slot 201 comprises symbols 203-209. The slot 202 comprises symbols 210-216. Symbols 208, 209, 215 and 216 are Demodulation (DM) Reference Signals (RS), and are used to derive channel estimates which are needed for coherent demodulation of the remaining symbols that are modulated with payload data. LTE Rel 9 also defines several other antenna port configurations for antenna ports 0-3 and 5, where port 0-3 are unprecoded CRS antenna ports and port 5 is DMRS for single-layer data transmission defined in Rel-8. Each symbol has a time duration equal to approximately T, which is a function of the slot time. In this embodiment, the slot time is 500 μsec. Since the first symbol in the slot has more cyclic prefix samples, not all symbols are exactly equal in duration, as per 3GPP TS36.211. Nevertheless, all symbols can be considered to be approximately equal in duration, which doesn't exceed 75 μsec. Note that if all symbols were exactly equal in duration, the symbol time T would approximately be equal to 500 μsec/7=71.4 μsec.

In some embodiments of the invention, the set of reference signal sequences comprises CAZAC sequences and near—CAZAC sequences. Near—CAZAC is a term which designates sequences which are obtained using computer search methods, and whose properties approximate CAZAC properties. In some embodiments of the invention, CAZAC sequences are Zadoff—Chu sequences. In some embodiments of the invention, near—CAZAC sequences are sequences of the form $\exp(j*\pi*\phi(n)/4)$; wherein the length of $\phi(n)$ is an integral multiple of 12. Here, "j" is the imaginary unit.

In some embodiments of the invention, the set of reference signal sequences comprises CAZAC sequences only. In some embodiments of the invention, the set of reference signal sequences comprises near—CAZAC sequences only. In some embodiments of the invention, the set of reference signal sequences comprises both CAZAC sequences and near—CAZAC sequences. Sometimes, a phase ramp is applied to modify the first sequence, for example $\exp(j*n*\alpha+j*\pi*\phi(n)/4)$ can still be considered as a reference signal sequence. For 3GPP EUTRA, there are 30 possible sequences of length 24, which are also near—CAZAC. For length 36 and more, sequences are produced from CAZAC sequences. Thus, the set of reference signal sequences comprises both CAZAC and near—CAZAC sequences.

Further details on the construction of reference signals, demodulation reference signals and sounding reference signals are included in 3rd Generation Partnership Project; GPP TS 36.211 V9.1.0 (2010) "Technical Specification Group Radio Access Network; Evolved Universal Terrestrial Radio Access (E-UTRA); Physical Channels and Modulation," in particular in section 6 and which is incorporated herein by reference.

Figure 3:
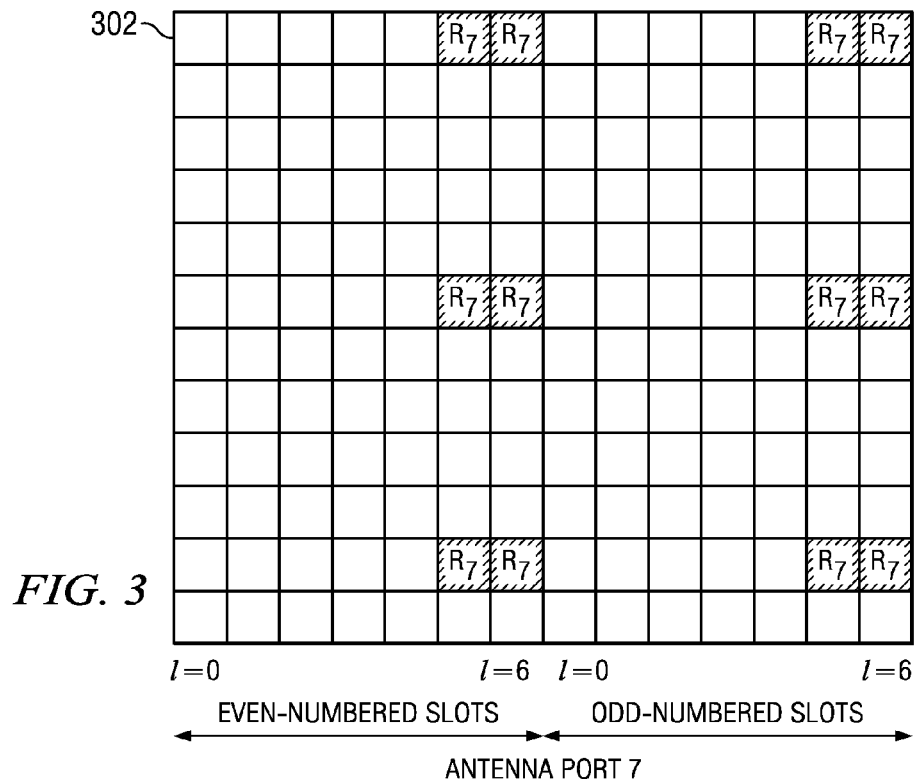
FIGS. 3 and 4 illustrate a resource block with DMRS pattern for a transmission layer on antenna port 7 and port 8.
Figure 4:
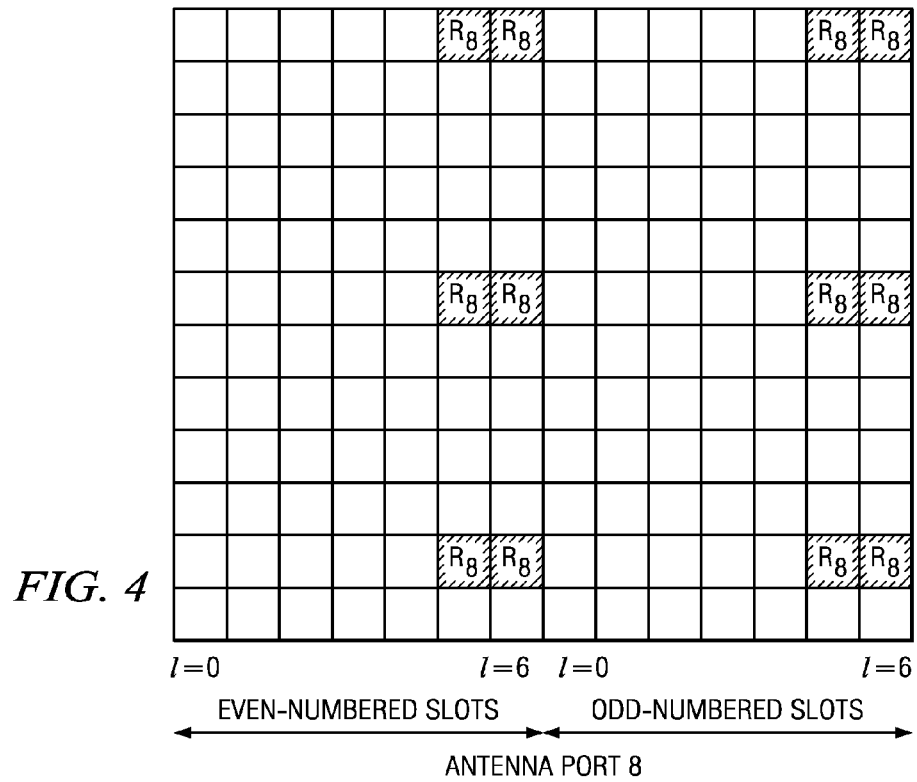

FIGS. 3 and 4 illustrate a resource block with DMRS pattern for a transmission layer on antenna port 7 and port 8, respectively. Each resource block includes a set of resource elements, where one resource element is a resource grid uniquely defined by one subcarrier and one OFDM symbol. For normal CP, one resource block has 12 subcarriers and 14 OFDM symbols, hence it comprises of 12×14=168 resource elements. A group of resource element 310 is representative and was described in more detail with reference to FIG. 2. FIG. 3 illustrates a resource block (RB) with a normal CP for downlink transmission on antenna port 7. Each RB has twelve DMRS ($R_7$), distributed in four OFDM symbols where each OFDM symbol has three DMRS. FIG. 4 illustrates an RB with normal CP for downlink transmission on antenna port 8. Each RB has twelve DMRS ($R_8$), distributed in four OFDM symbols where each OFDM symbol has three DMRS. The twelve DMRS symbols within the RB supporting beamforming on antenna ports 7 and 8 are demodulation reference symbols for PDSCH transmission in the RB.

Two types of MIMO precoding are standardized in LTE Rel-8.

The first type is codebook-based precoding with CRS, where precoding matrixes are confined within a given codebook. Spatial multiplexing is supported with multiple layers in PDSCH. PDSCH demodulation is based on CRS.

The second type is non-codebook-based precoding with DMRS where precoding matrices are not necessarily within a codebook and can be arbitrary. 1-layer beamforming with DMRS is supported. PDSCH demodulation is based on DMRS.

While LTE Rel-8 supports single layer beamforming with DMRS, no explicit support of multi-user (MU) MIMO with single-layer beamforming is provided. However multi-user beamforming is explicitly supported in LTE Rel-8 as two or more UEs in transmission mode 7 can be scheduled to the same physical resource block (PRB). This is a pure eNB implementation issue and is transparent to the UE. In case grid of beam (GoB) type of beamforming is applied, there will be good attenuation between different users allocated to different beams so that the performance of DMRS based channel estimation at the UE is not impacted. The effective DMRS density per user is not reduced which would have been the case if LTE-A type of orthogonal DMRS is used.

For example: four orthogonal beams may be created to cover one sector. Each beam can support one UE with single-layer beamforming, hence four UEs can be implicitly supported in LTE-Rel-8 MU-MIMO mode. With DMRS single-layer beamforming, MU-MIMO in LTE Rel-8 is an eNB implementation issue and transparent to UE, no extra signaling about the presence of other UE is provided in the L3 radio resource control (RRC) signaling or L1/L2 control signaling. Reporting of channel quality indicator (CQI) and precoding matrix index (PMI) is supported. Codebook based precoding is the baseline of PMI report where Rel-8 2TX codebook is assumed for PMI reporting.

Rel-8 MU-MIMO is based on codebook based precoding where the precoding matrix for each user/layer is selected from a predefined codebook. A single codeword is transmitted to each user where the codeword is mapped to a single layer. Because the limited flexibility of UE pairing and less-refined CQI report results in less optimal link adaptation, the performance gain of MU-MIMO in Rel-8 over SU-MIMO is expected to be limited.

Compared to codebook-based precoding where precoding matrices are selected from a finite set of pre-defined matrices (codebook), precoding matrices used in non-codebook precoding can be chosen more flexibly and therefore are more flexible to achieve a precoding gain. To enable a UE to estimate the precoding matrices and the downlink channel, UE-specific DMRS is used for data demodulation where the DMRS symbols are precoded by the same precoding matrices applied on the data. Hence the UE is able to estimate the "effective" downlink channel—a combination of actual downlink physical channel and precoding matrices—to perform data decoding.

DMRS supporting non-codebook based precoding is already specified in LTE Rel-8 for single-layer beamforming, where only a single spatial layer (e.g. data stream) is transmitted to a UE. In addition, DMRS will only be present in the physical resources of downlink data transmission that is scheduled for a UE. In addition, the frequency-domain position of DMRS for a UE will be offset by a cell-specific parameter, e.g. Cell-ID in Rel-8. This is to ensure randomization of the frequency domain position of the DMRS symbols in different cells as to reduce inter-cell interference. Similarly, cell-specific reference signal (CRS) in Rel-8 is also offset by the cell-ID in Rel-8, as to randomize the CRS position and reduce inter-cell interference.

There are currently two definitions of "transparency". A first type of transparency is defined in terms of SU/MU-MIMO mode. Non-transparency means that a UE is semi-statically configured in either the SU or MU-MIMO mode which is signaled to the UE via higher layer signaling. UE is semi-statically configured to operate in SU-MIMO transmission mode or MU-MIMO transmission mode, hence different DL (downlink) control and UE feedback are used. Higher layer (L3) radio resource control (RRC) signaling configures the SU/MU-MIMO mode for the UE. Transparency means that the UE is configured in one joint SU/MU MIMO transmission mode, thus the same UE feedback and DL control.

A second type of transparency is defined in terms of knowledge of the co-scheduled UE. Non-transparency means that the presence of a co-scheduled UE is known and possibly taken into account in the DL control signaling and UE feedback. On the other hand, non-transparency means that UE is agnostic about the presence of a co-scheduled UE, hence the same UE feedback and DL control is used.

Regardless of which definition is used, "transparency" essentially means that no signaling is provided to the UE regarding transmission to the other UEs in the same time/frequency resources. If the presence of a co-scheduled UE is provided to the target UE, MU-MIMO transmission is "non-transparent". For example, in LTE Rel-8, MU-MIMO is a semi-statically configured transmission mode, hence a UE will know that it will be paired up with another UE if it is configured in such a transmission mode. Another possibility is to signal to the UE dynamically whether or not transmission to another UE is present, that is, a dynamic downlink grant has been provided on the PDCCH. In this case, a UE can be either configured in the semi-static SU or MU-mode.

Dynamic rank-adaptation is already supported for SU dual-layer beamforming in LTE Rel-9, therefore a UE can receive rank-1 or rank-2 beamforming. This can be done with a 1-bit transmit rank indicator (TRI) value included in the DL grant, or by signaling of the enabling/disabling of one of the two transport blocks in the DL grant. For MU-MIMO in LTE Rev-8, a UE is restricted to receive rank-1 and hence the TRI field is not required in the DL grant.

If SU/MU mode is RRC signaled, the UE need to be semi-statically configured in a SU or MU mode. As a result, the MU-MIMO mode needs to define a different DL DCI (downlink control information) format than SU-MIMO dual-layer beamforming.

In an embodiment of the invention, the DL grant for MU-MIMO may need to include a 1-bit indicator of the index of the layer, which is needed for identifying the associated DMRS for channel estimation and rank-1 PDSCH decoding.
Semi-Static SU-MIMO and MU-MIMO Mode for Dual-Layer Beamforming In this approach, a UE is semi-statically configured by higher layer RRC signaling in either the SU or MU-MIMO mode. For SU and MU-MIMO mode, different downlink grant (DCI) formats and different UE CQI (channel quality information) report schemes are used.

An exemplary DCI format in response to SU-MIMO dual-layer beamforming may include the precoding-related control fields listed in Table 1.

TABLE 1

| DCI format for SU-MIMO dual layer beamforming in a semi-static environment | |
|---|---|
| Control fields | Number of bits |
| Transmit rank indicator (RI) | 1 |
| TBS1 - MCS (modulation and coding scheme) | 5 |
| TBS1 - NDI (new data indicator) | 1 |
| TBS1 - RV (redundancy version) | 2 |
| TBS2 - MCS | 5 |
| TBS2 - NDI | 1 |
| TBS2 - RV | 2 |
| Codeword-to-layer swapping flag | 1 |

As shown in Table 1, a 1-bit transmit rank indicator (TRI) is used to signal the number of layers in DL transmission. For example, TRI=1 means rank-1 (1 layer, 1 codeword) is transmitted to a UE, while TRI=2 means rank-2 (2 layers, 2 codewords) are transmitted to a UE. All DL layers are transmitted to the same user. A five bit MCS (modulation and coding scheme) field, a one bit NDI (new data indicator) and a two bit RV (redundancy version) is provided for transport block 1 and for transport block 2.

A one bit transport-block to codeword swapping flag is also provided. This bit indicates the mapping between transport blocks and codewords, which can be either: TB 1–>codeword 1, TB–2>codeword 2; or TB 1–>codeword 2, TB–2>codeword 1.

For TRI=1 single-layer (rank-1) transmission, either the first or the second transport block is disabled (i.e. not transmitted). This can be signaled by MCS=0 and RV=1 for the corresponding transport block, as used in Rel-8.

In this scheme, precoding fields are not required, since precoding is non-codebook based.

Alternatively, for SU-MIMO dual-layer beamforming, the DL grant may re-use DCI format 2 or 2A in LTE Rel-8 codebook-based spatial multiplexing. In this case, the precoding fields in DCI 2/2A in Rel-8 are reserved. Alternatively, a new DCI format may be designed for dual-layer beamforming SU-MIMO by removing unused control fields of DCI 2/2A.

For semi-statically configured MU-MIMO mode dual-layer beamforming, a maximum of two codewords/layers may be transmitted simultaneously on the same frequency resources to two different UEs. The DCI format in response to MU-MIMO in includes the control fields listed in Table 2.

TABLE 2

| DCI format for MU-MIMO dual layer beamforming in a semi-static environment | |
|---|---|
| Control fields | Number of bits |
| MCS | 5 |
| NDI | 1 |
| RV | 2 |
| Power sharing indication | 1 |
| DMRS layer indication | 1 |

Since each UE is restricted to receive rank-1 single-layer, no explicit signaling of the TPI is included in the DCI format. A five bit MCS (modulation and coding scheme) field, a one bit NDI (new data indicator) and a two bit RV (redundancy version) is provided for one transport block.

Precoding fields are not required, since precoding is non-codebook based. The codeword for each layer is implicit for that layer.

Since total DL transmit power is shared by two UEs, it is possible to include 1-bit power sharing information in the DCI format for MU-MIMO, as follows:

Bit=0: DL EPRE (energy per resource element) of PDSCH equals to rho, where rho is the semi-statically configured DL PDSCH EPRE (dB) for the UE.

Bit=1: DL EPRE of PDSCH equals to rho-3, where rho is the semi-statically configured DL PDSCH EPRE (dB) for the UE.

This power sharing bit can also be understood as an implicit signaling of the presence of the co-scheduled UE. When a co-scheduled UE is present, the transmit power to each UE is reduced by half (3 dB).

Additionally, the UE also needs to know which one of the two layers carries the target PDSCH data to itself in order to properly perform downlink channel estimation and demodulation. Therefore, a 1-bit signaling of the index of the DMRS layer is required to indicate which of the two layers is targeting this UE, and on which layer the UE should demodulate the DMRS.

Dynamic SU/MU-MIMO Switching for Dual-Layer Beamforming

In the case of dynamic SU/MU-MIMO switching, a UE receives its SU/MIMO configuration message in the DL grant and it is possible for the UE to fast switch between SU/MU transmissions via L1/L2 control signaling (e.g. PDCCH). A common DL grant is used for both SU/MIMO transmissions. The control fields in the DCI format may include information similar to that listed in Table 1.

As listed in Table 1, a one bit transmit rank indicator (TRI) to signal the number of layers in DL transmission is included in the DCI. TRI=1 indicates 1 layer (1 codeword) is transmitted in the DL, and TRI=2 indicates two layers (two codewords) are transmitted in the DL. Note that these layers can be transmitted to one UE or two UEs respectively. A five bit MCS (modulation and coding scheme) field, a one bit NDI (new data indicator) and a two bit RV (redundancy version) is provided for transport block 1 and for transport block 2.

A one bit transport-block to codeword swapping flag is optionally provided. This bit indicates the mapping between transport blocks and codewords. If 1-bit transport block to codeword swapping flag is not included, a fixed mapping between transport block and codeword is assumed.

In this scheme, precoding fields are not required, since precoding is non-codebook based. Note that a fixed mapping rule can be applied on the codeword to DMRS mapping so that the codeword is implicit for each layer. For example, codeword 1 is always transmitted and demodulated with DMRS sequence 1 (port 7), codeword 2 is always transmitted and demodulation with DMRS sequence 2 (port 8). This applies regardless of whether TDM/FDM multiplexing or CDM multiplexing is configured for the two DMRS layers.

In order for one DL grant format to work for both SU/MU-MIMO modes, the DL grant possesses information about which mode (SU or MU) the UE is expected to operate in. This could be implemented in a few ways.

In a first embodiment, a one bit flag of SU/MU switching is explicitly included in each DL grant. This bit indicates that the corresponding PDSCH are for a single user (SU) or for two users (MU).

The transport block to codeword mapping is signaled by one bit in the DL grant, and an explicit fixed mapping between codeword to DMRS layer is assumed, i.e., codeword 1 is transmitted on DMRS layer 1 and codeword 2 is transmitted on DMRS layer 2. If SU-MIMO is detected (1-bit in PDCCH), the relationships between the transport blocks and the DMRS layers are clearly defined.

In the case of MU-MIMO, rank-1 single-layer is received by each UE. Signaling the index to the DMRS layer may not be needed. The index to the DMRS layer may be implicitly derived in the following manner as listed in Table 3.

TABLE 3

Derivation of index to DMRS layer from rank indicator (RI)
for MU-MIMO dual layer beamforming with dynamic switching

| SU/MU | RI | Two TBSs | Interpretation |
|---|---|---|---|
| SU | RI = 1 | Enabled, disabled | Clear |
| SU | RI = 2 | Enabled, enabled | Clear |
| MU | RI = 1 | Enabled, enabled | UE may need to assume that the $1^{st}$ TBS (transport block size) is always the desired TBS and the $2^{nd}$ TBS is associated with the co-scheduled UE. Index of the desired DMRS layer is easily obtained from TB to codeword swapping flag. The TBS fields of the second TBS can be used to signal the MCS of the interference signal, useful for the target UE's interference estimation or SIC cancellation. |
| MU | RI = 1 | Enabled, disabled | UE assumes the enabled TBS is for itself. Index of the desired DMRS layer is easily obtained from the enabled TBS and TB-to-codeword swapping flag.<br>The 1-bit NDI of the disabled TBS may be used to signal the presence of transmission to the co-scheduled UE. For example, NDI = 0 indicates that there is no co-scheduled UE in the same subframe, while NDI = 1 indicates that there is a co-scheduled UE in the same subframe. Such information is helpful for the UE to correctly interpret the PDSCH EPRE, to perform interference estimation and nullification to improve MU-MIMO performance. |
| MU | RI = 2 | Enabled, enabled | UE may need to assume that the $1^{st}$ TBS is always the desired TBS and the $2^{nd}$ TBS is for the co-scheduled UE. Index of the desired DMRS layer is obtained from TB to codeword swapping flag. The TBS fields of the second TBS can be used to signal the MCS of the interference signal, useful for the target UE's interference estimation or SIC cancellation. |
| MU | RI = 2 | Enabled, disabled | UE assume the enabled TBS is for itself. Index of the desired DMRS layer is easily obtained from the enabled TBS and TB-to-codeword swapping flag. 1-bit NDI of the disabled TBS may be used to signal the presence of transmission to the co-scheduled UE. For example, NDI = 0 indicates that there is no co-scheduled UE in the same subframe, while NDI = 1 indicates that there is a co-scheduled UE in the same subframe. |

Alternatively, the DMRS layer of the target rank-1 PDSCH may be explicitly signaled (using 1-bit, for example) in the DL grant. TBS (transport block size) fields of the interfering transport block (e.g. MCS level) could be used for interference estimation and cancelation. For example, for an advanced receiver which is capable to perform successive interference cancellation, it may use the MCS level of the interference signal to decode the other stream (interference) first, subtract it from the received signal to improve the decoding reliability of its own data stream.

In a second embodiment, SU/MU switching may be explicitly signaled by other approaches, e.g., masking the CRC of the PDCCH with different scrambling sequences. For example, scrambling sequence 1=UE shall receive both transport blocks (SU-MIMO). Scrambling sequence=0 means UE should receive only one transport block (MU-MIMO).

In this case, the interpretation of DMRS layer, presence of the co-scheduled UE, MCS of the co-scheduled UE can be similarly obtained as in Table 3. Index of the DMRS layer may be either derived with RI+TBS enabling/disabling configuration as in Table 3, or explicitly signaled in DL grant.

In a third embodiment, it is also possible to apply more scrambling sequences to the PDCCH CRC to further differentiate the index of the DMRS layer that a UE will use to demodulate PDSCH when configured in SU-MIMO transmission. However, this reduces the UE-ID space and negatively impacts the system capacity.

In other embodiments of the invention, for dynamic SU/MU mode with the same PDCCH format, some information may also be implicitly signaled by different masking of the CRC of the PDCCH with different scrambling sequences. This includes: presence of a co-scheduled UE, indexing to the DMRS layer, SU/MU-MIMO mode, or combinations of the above.

An embodiment of the invention is specified in 3rd Generation Partnership Project; Technical Specification Group Radio Access Network; Evolved Universal Terrestrial Radio Access (E-UTRA); Physical Channels and Modulation (Release 9) 3GPP TS 36.211 V9.1.0 (2010-03)), section 6.3.3.4. Spatial multiplexing using antenna ports with UE-specific reference signals supports two antenna ports and the set of antenna ports used is p∈{7,8}. For transmission on two antenna ports, p∈{7,8}, the precoding operation is defined by:

$$\begin{bmatrix} y^{(7)}(i) \\ y^{(8)}(i) \end{bmatrix} = \begin{bmatrix} x^{(0)}(i) \\ x^{(1)}(i) \end{bmatrix}$$

where $i = 0, 1, \ldots, M_{symb}^{ap} - 1$, $M_{symb}^{ap} = M_{symb}^{layer}$.

3rd Generation Partnership Project; Technical Specification Group Radio Access Network; Evolved Universal Terrestrial Radio Access (E-UTRA); Multiplexing and channel coding (Release 9) 3GPP TS 36.212 V9.1.0 (2010-03) contains a description of DCI format 2B in section 5.3.3.1.5B in accordance with aspects described herein.

Figure 5:
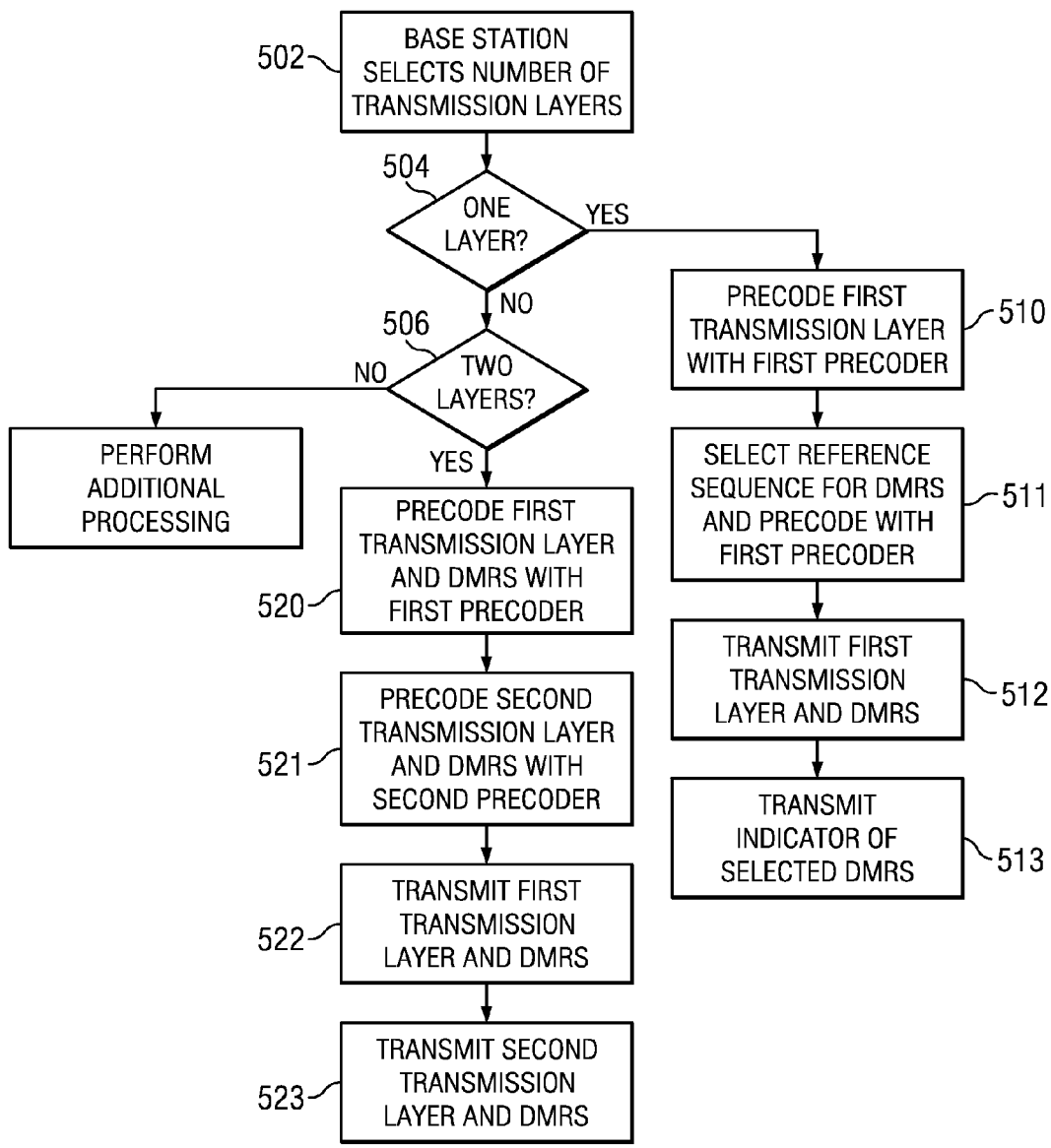
FIG. 5 is a flow diagram illustrating selection and transmission of one or two transmission layers.

FIG. 5 is a flow diagram illustrating operation of MIMO transmission with eNB selection of transmission layers. The eNB selects 502 the number of transmission layers based on available resources and amount of data that needs to be transmitted. The eNB also decides whether to transmit one UE in SU-MIMO or to transmit to two, or more, UE in MU-MIMO. When one layer is selected 504, the eNB precodes 510 a first transmission layer with a first precoder. Since non-codebook precoding is being used in this mode, the eNB may select a precoder based on channel conditions or other considerations.

The eNB produces a first DMRS using a first cyclic shift and a base sequence. It may also produce a second DMRS using a second cyclic shift and base sequence. These reference signals may be produced using CAZAC-like sequences, as described in more detail earlier.

Once the reference sequences are produced, the eNB selects either the first DMRS or the second DMRS and precodes 511 it using the first precoder. Herein the first DMRS sequence corresponds to DMRS antenna port 7, and the second DMRS sequence corresponds to DMRS antenna port 8. The eNB then transmits 512 the first transmission layer on antenna port 7 or 8 along with the precoded DMRS to a UE using resource blocks as described with reference to FIGS. 2-4.

The eNB also transmits 513 an indicator to the UE to indicate which DMRS sequence is selected and transmitted. In this embodiment, the indicator is a single bit that is included in a downlink grant that is sent to the UE to prepare it to receive the transmission layer from the eNB. The downlink grant also indicates that only one transmission layer is being used via the rank indicator (RI) bit or though transport block enabling/disabling mechanism in the DCI. The downlink grant may also indicate SU or MU mode.

When two transmission layers are selected 506, then the eNB precodes 520 a first transmission layer with a first precoder, and precodes 520 a first DMRS sequence using the first precoder. The eNB precodes 521*a* second transmission layer with a second precoder, and precodes 521*a* second DMRS sequence using the second precoder.

The eNB transmits 522 the first transmission layer and the first DMRS sequence to the UE, and also transmits 523 the second transmission layer and the second DMRS sequence to the UE. In this case, the associated downlink grant DCI optionally included an RI that indicates two transmission layers.

As described above, a fixed mapping rule is applied on the codeword to DMRS mapping so that the codeword is implicit for each layer. For example, codeword 1 is always transmitted and demodulated with DMRS sequence 1, codeword 2 is always transmitted and demodulation with DMRS sequence 2.

Figure 6:
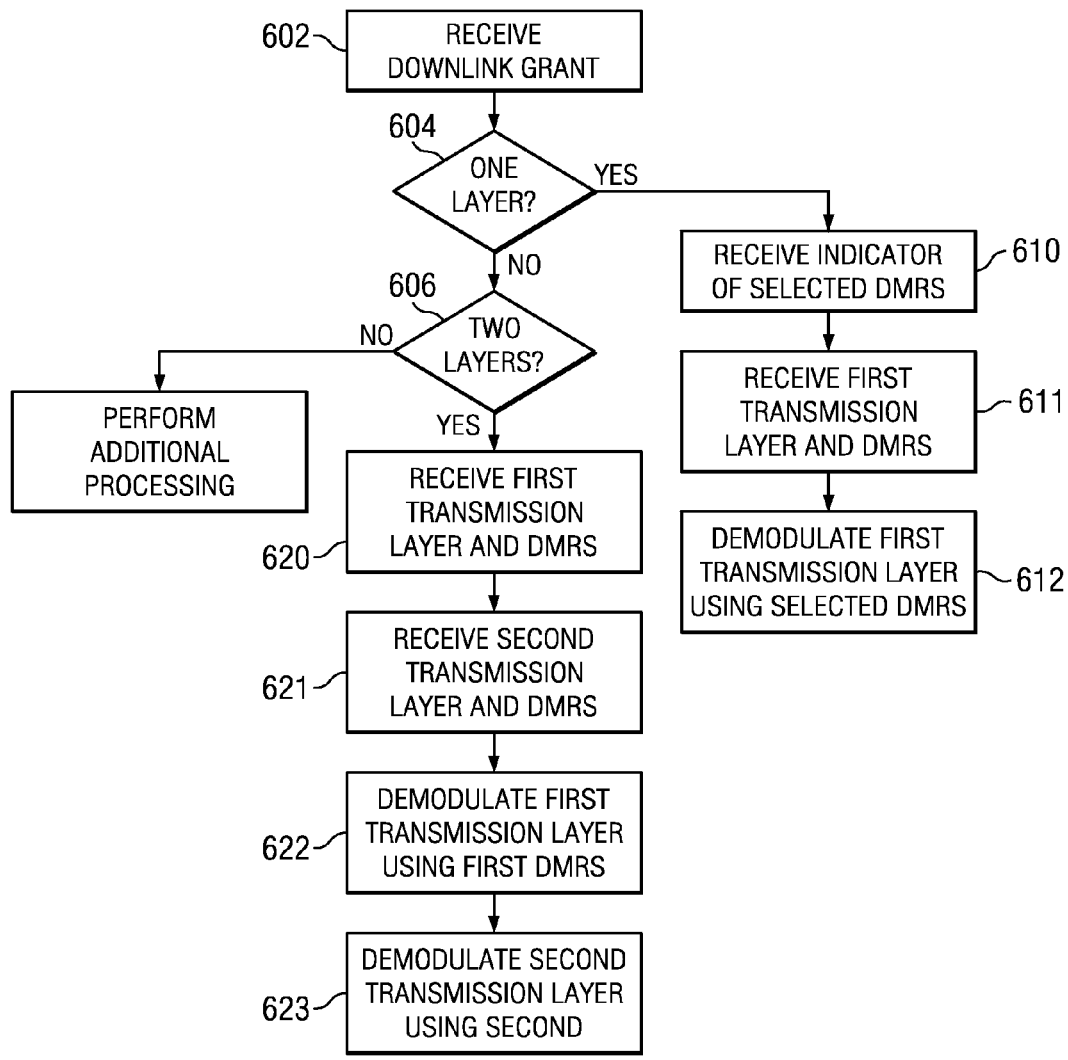
FIG. 6 is a flow diagram illustrating reception of one or two transmission layers.

FIG. 6 is a flow diagram illustrating reception by a UE of one or two transmission layers in MIMO transmission. The UE receives 602 from an eNB a downlink grant with DCI granting the UE one transmission layer or two transmission layers on PDSCH using an explicit RI indicator or through transport block enabling/disabling indication in DCI. When one transmission layer is indicated 604, the UE receives 610 an indicator from the eNB to indicate which demodulation reference signal (DMRS) sequence was selected by the eNB, i.e. a first DMRS sequence (port 7) or a second DMRS sequence (port 8). The UE has foreknowledge of the possible sequences and now knows the exact sequence to expect in the DMRS, and on which antenna port (7 or 8) to perform channel estimation. In this embodiment, the indicator is a one bit field in the DCI of the downlink grant. The UE then receives 611*a* first transmission layer from the eNB with the selected DMRS. Since the UE knows the expected DMRS sequence, it uses this knowledge to assist in demodulating 612 the DMRS to determine the precoding matrix, which is a non-codebook precoder. The UE then uses this information to demodulate 612 the first transmission layer, wherein the first transmission layer and the selected DMRS have a same precoding.

When two transmission layers are indicated 606, the UE receives 620 from the eNB a first transmission layer and a first DMRS having a first sequence. It also receives 621 from the eNB a second transmission layer and a second DMRS having a second sequence. It has foreknowledge of the possible DMRS sequences and when two transmission layers are received a fixed mapping is assumed, so it knows the sequence for each of the two DMRS. Using this information, the UE demodulates 622 the first DMRS and the first transmission layer, wherein the first transmission layer and the selected DMRS have the same precoding. The UE also demodulates 623 the second DMRS and the second transmission layer, wherein the second transmission layer and the selected DMRS have the same precoding.

Figure 7:
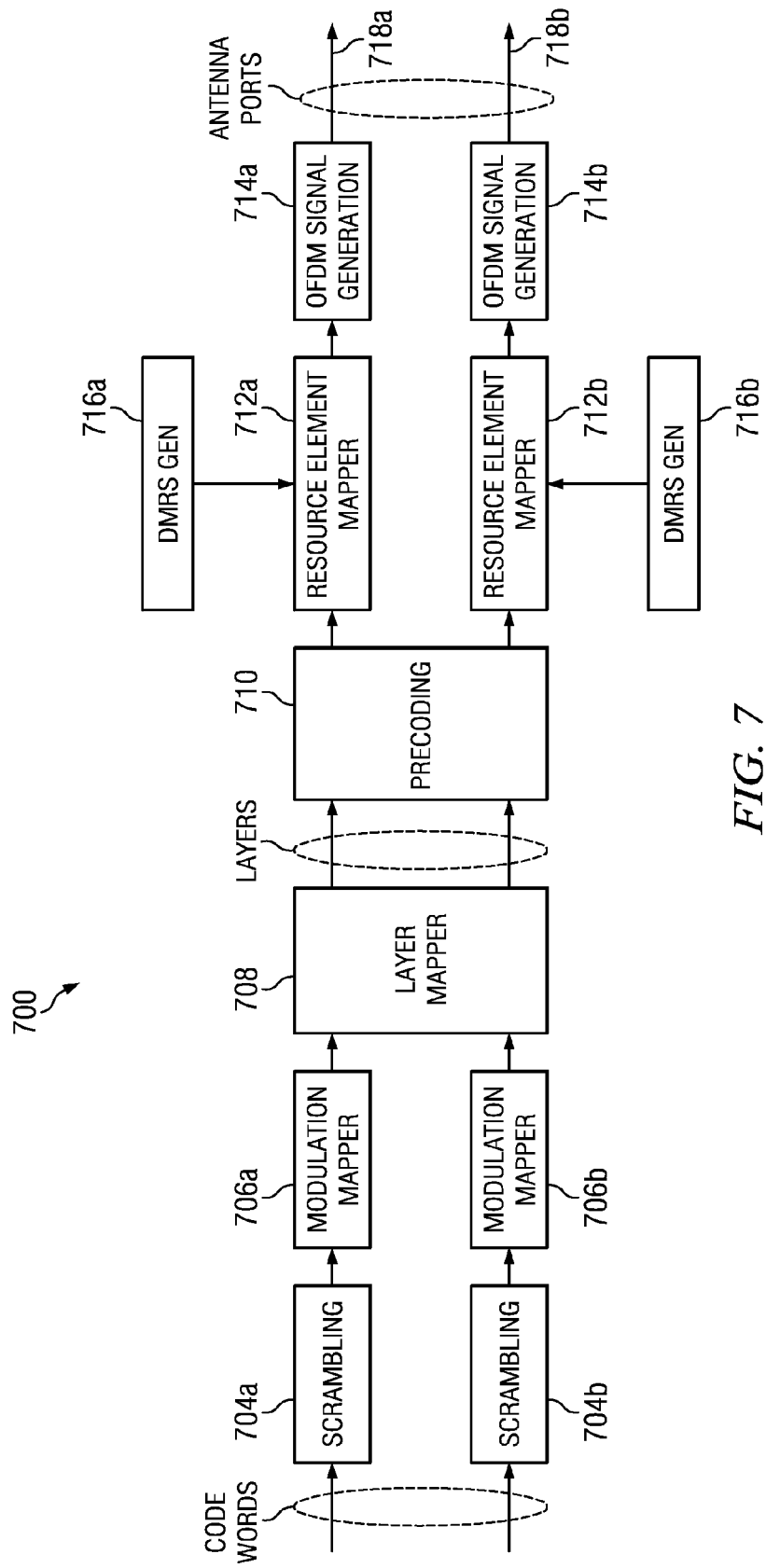
FIG. 7 is a block diagram of an illustrative transmitter for transmission of a MIMO signal in the network of FIG. 1 according to an embodiment of the invention.

FIG. 7 is a block diagram of an illustrative transmitter 700 for transmission of a MIMO signal. A baseband signal representing a downlink physical channel is formed by providing a stream of code words 702*a*, *b* to scrambling logic 704*a*, *b*. In this embodiment, there are two transmission layers illustrated which are indicated by 702*a* and 702*b*, etc. Other embodiments may have additional layers.

Scrambling logic 704*a*, *b* scrambles the coded bits in each of the code words to be transmitted on a physical channel. The scrambled bits are then provided to modulation mapper logic 706*a*, *b* which maps the scrambled bits to modulation constellations to generate complex-valued modulation symbols. For example, the PUSCH may use one of the following modulation schemes: QPSK (quaternary phase shift keying), 16QAM (quaternary amplitude modulation), or 64QAM.

The modulated symbols are then provided to layer mapping logic 708 for mapping of the complex-valued modulation symbols onto one of several transmission layers. The number of layers v is less than or equal to the number of antenna ports P used for transmission of the physical channel. The resulting complex-valued modulation symbols on each layer are then precoded for transmission on the antenna ports.

The complex-valued modulation symbols for each antenna port and the DMRS for each antennae are then mapped to resource elements in resource element mappers 712*a*, *b*. DMRS generators 716*a*, *b* generate the DMRS, as described in more detail above.

The resource mapped symbols are then provided to OFDM signal generation logic 714*a*, *b* for the generation of complex-valued time-domain OFDM signals 718*a*, *b* for each antenna port.

System Example

Figure 8:
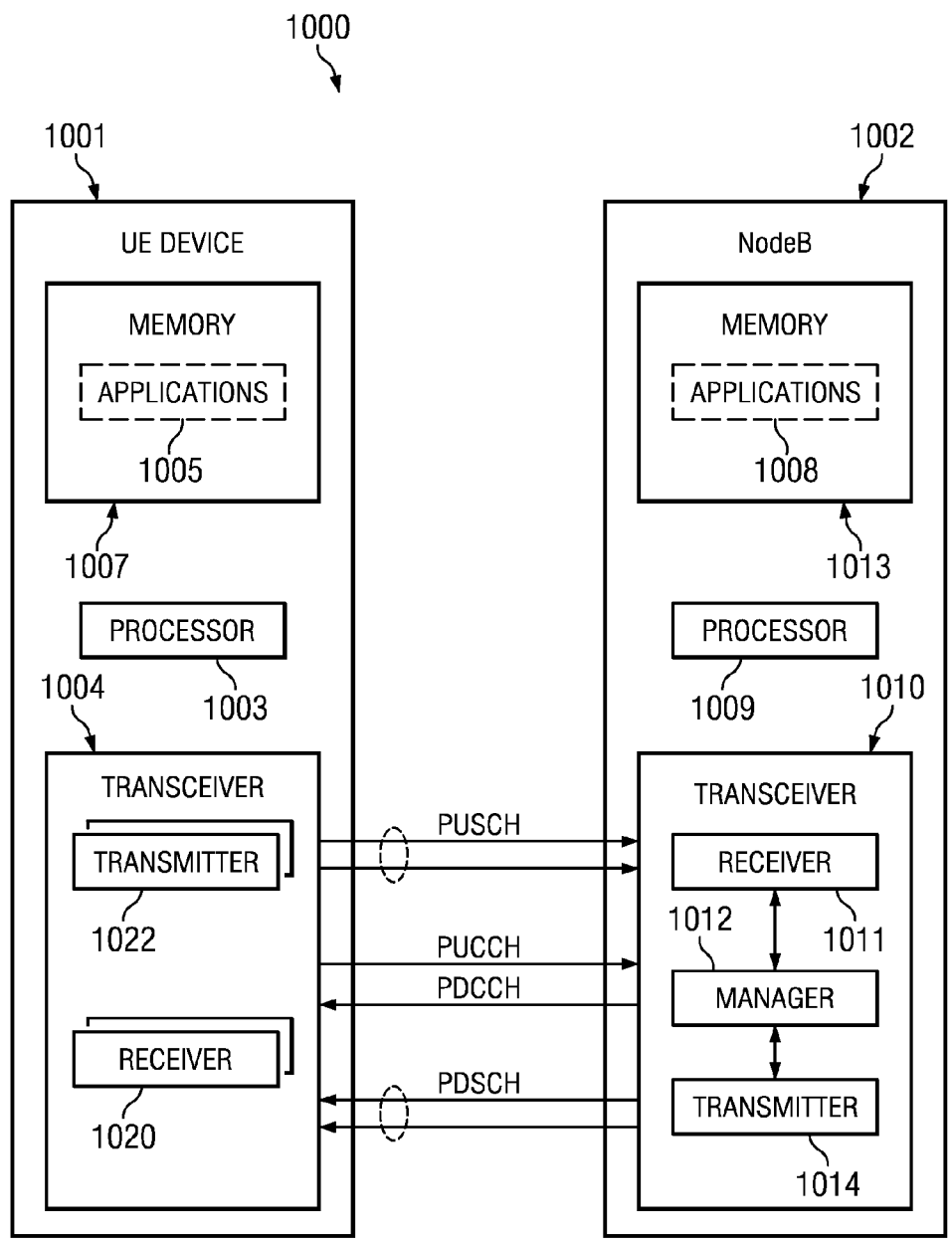
FIG. 8 is a block diagram illustrating an exemplary portion of a cellular network with a base station in communication with a mobile device.

FIG. 8 is a block diagram illustrating an exemplary portion of the cellular network of FIG. 1. As shown in FIG. 8, the wireless networking system 1000 includes a UE device 1001 in communication with an eNB 1002. The UE device 1001 may represent any of a variety of devices such as a server, a desktop computer, a laptop computer, a cellular phone, a Personal Digital Assistant (PDA), a smart phone or other electronic devices. In some embodiments, the electronic UE device 1001 communicates with the eNB 1002 based on a LTE or E-UTRA protocol. Alternatively, another communication protocol now known or later developed can be used.

As shown, the UE device 1001 includes a processor 1003 coupled to a memory 1007 and a Transceiver 1004. The memory 1007 stores (software) applications 1005 for execution by the processor 1003. The applications 1005 could be any known or future application useful for individuals or organizations. As an example, such applications 1005 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1005, at least some of the applications 1005 may direct eNB (base-station) 1002 to transmit DL signals to UE device 1001 periodically or continuously via the transceiver 1004.

Transceiver 1004 includes uplink logic which may be implemented by execution of instructions that control the operation of the transceiver. Some of these instructions may be stored in memory 1007 and executed when needed. As would be understood by one of skill in the art, the components of the uplink and downlink logic may involve the physical (PHY) layer and/or the Media Access Control (MAC) layer of the transceiver 1004. Transceiver 1004 includes two or more receivers 1020 and two or more transmitters 1022 for SU/MU-MIMO, as described in more detail above.

eNB 1002 includes a Processor 1009 coupled to a memory 1013 and a transceiver 1010. Memory 1013 stores applications 1008 for execution by the processor 1009. The applications 1008 could be any known or future application useful for managing wireless communications. At least some of the applications 1008 may direct the base-station to manage transmissions to or from the user device 1001.

Transceiver 1010 includes an resource manager which enables eNB 1002 to selectively allocate uplink PUSCH resources and downlink PDSCH resources to the user device 1001. As would be understood by one of skill in the art, the components of the resource manager 1012 may involve the physical (PHY) layer and/or the Media Access Control (MAC) layer of the transceiver 1010. Transceiver 1010 includes a Receiver 1011 for receiving transmissions from various UE within range of the eNB and transmitter 1014 for transmission to the various UE within range. The resource manager executes instructions that control the operation of transceiver 1010. Some of these instructions may be located in memory 1013 and executed when needed. The resource manager controls the transmission resources allocated to each UE that is being served by eNB 1002 and broadcasts control information via the physical downlink control channel PDCCH.

During MIMO transmission from eNB 1002 via transmitters 1014 on PDSCH, eNB 1002 monitors channel conditions to adapt to the prevailing condition. This includes monitoring the channel quality indicator (CQI) feedback provided by UE 1001 on the uplink channel using condition monitoring logic 1012 that is coupled to receiver 1011.

During MIMO transmission to UE 1001 via transmitters 1014 on PDSCH, eNB 1002 forms DMRS signals using different amounts of cyclic shift, depending on the number of layers being used for transmission, as described in more detail above.

A typical eNB will have multiple sets of receivers and transmitters which operate generally as described herein to support hundreds or thousand of UE within a given cell. Each transmitter may be embodied generally by a processor 1009 that executes instructions from memory 1013 to perform the scrambling, mapping, and OFDM signal formation, using signal processing techniques as are generally known in the art along with embodiments of the invention described herein.
Other Embodiments While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While the invention has been described with reference to DL transmission, it may be equally applied to UL transmission.

Embodiments of the invention may support single user dual-layer beamforming using UE specific RS for both LTE-TDD and FDD.

The term "frame" and "subframe" are not restricted to the structure of FIG. 2-4. Other configurations of frames and/or subframes may be embodied. In general, the term "frame" may refer to a set of one or more subframes. A transmission instance likewise refers to a frame, subframe, or other agreed upon quantity of transmission resource.

Embodiments of this invention apply to various types of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

As described in general above, embodiment of the invention may perform all tasks described herein such as channel monitoring and precoding selection, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for transmitting in a downlink channel of a cellular network, the method comprising:
    selecting by a base station (eNB) to transmit either one or two transmission layers;

when one transmission layer is selected:
  preceding a first transmission layer with a first precoder;
  selecting a first demodulation reference signal (DMRS) sequence or a second DMRS sequence and preceding the selected DMRS sequence using the first precoder;
  transmitting the first transmission layer with the selected precoded DMRS from the eNB to a user equipment (UE); and
  transmitting an indicator to the UE to indicate which DMRS sequence is selected and transmitted.

2. The method of claim 1, wherein when two transmission layers are selected, comprising:
  preceding a first transmission layer with a first precoder, and preceding a first DMRS sequence using the first precoder;
  preceding a second transmission layer with a second precoder, and preceding a second DMRS sequence using the second precoder;
  transmitting the first transmission layer and the first DMRS sequence to the UE; and
  transmitting the second transmission layer and the second DMRS sequence to the UE.

3. The method of claim 1, wherein the indicator is a one-bit indicator comprised in a downlink grant.

4. Method for receiving in a downlink channel of a cellular network, the method comprising:
  receiving at a user equipment (UE) a rank indicator from a base station (eNB) indicating one transmission layer or two transmission layers;
  when one transmission layer is indicated:
    receiving an indicator from the eNB to indicate which demodulation reference signal (DMRS) sequence was selected by the eNB from a first DMRS sequence or a second DMRS sequence;
    receiving a first transmission layer from the eNB with the selected DMRS; and
    demodulating the selected DMRS and the first transmission layer, wherein the first transmission layer and the selected DMRS have a same precoding.

5. The method of claim 4, wherein the indicator is a one-bit indicator comprised in a downlink grant.

6. The method of claim 4, wherein when two transmission layers are indicated, comprising:
  receiving at the UE from the eNB a first transmission layer and a first DMRS having a first sequence;
  receiving at the UE from the eNB a second transmission layer and a second DMRS having a second sequence;
  demodulating the first DMRS and the first transmission layer, wherein the first transmission layer and the selected DMRS have the same precoding; and
  demodulating the second DMRS and the second transmission layer, wherein the second transmission layer and the selected DMRS have the same precoding.

7. A base station for a cellular network, the device comprising;
  a transceiver configured to couple to a plurality of antenna, wherein the transceiver is configured to transmit to and receiver from user equipment via the plurality of antenna in the cellular network;
  a processor coupled to a memory configured to execute a control program in the memory for controlling the transceiver;
  wherein the transceiver is configured to select to transmit either one or two transmission layers;
  when one transmission layer is selected, the transceiver is configured to:
    precode a first transmission layer with a first precoder;
    select a first demodulation reference signal (DMRS) sequence or a second DMRS sequence and precode the selected DMRS sequence using the first precoder;
    transmit the first transmission layer with the selected precoded DMRS from the base station to a user equipment (UE); and
    transmit an indicator to the UE to indicate which DMRS sequence is selected and transmitted.

8. The base station of claim 7, wherein when two transmission layers are selected the transceiver is configured to:
  precode a first transmission layer with a first precoder, and precode a first DMRS sequence using the first precoder;
  precode a second transmission layer with a second precoder, and precode a second DMRS sequence using the second precoder;
  transmit the first transmission layer and the first DMRS sequence to the UE; and
  transmit the second transmission layer and the second DMRS sequence to the UE.

* * * * *